United States Patent
Wienand et al.

(10) Patent No.: US 6,437,680 B1
(45) Date of Patent: Aug. 20, 2002

(54) PROCESS FOR MANUFACTURE OF SENSORS, AND SENSOR SO MADE, PARTICULARLY A TEMPERATURE SENSOR

(75) Inventors: Karlheinz Wienand, Aschaffenburg; Gerhard Damaschke, Flörsheim, both of (DE)

(73) Assignee: Heraeus Electro-Nite International, N.V., Houthalen (BE)

( * ) Notice: Subject to any disclaimer, the term of this patent is extended or adjusted under 35 U.S.C. 154(b) by 0 days.

(21) Appl. No.: 09/588,482

(22) Filed: Jun. 6, 2000

(30) Foreign Application Priority Data

Jun. 14, 1999 (DE) .......................... 199 27 108

(51) Int. Cl.[7] .............................. H01C 3/04; H01C 7/02; H01C 7/04
(52) U.S. Cl. ............................ 338/25; 338/28; 29/610.1
(58) Field of Search ................... 338/22 R, 25, 338/29, 26, 28; 29/610.1, 610.2, 612

(56) References Cited

U.S. PATENT DOCUMENTS

| | | | |
|---|---|---|---|
| 3,110,088 A | | 11/1963 | Blom |
| 4,321,825 A | * | 3/1982 | Tarpley et al. .............. 73/204 |
| 4,365,229 A | * | 12/1982 | Tokarz .......................... 338/25 |
| 4,447,799 A | * | 5/1984 | Carlson ...................... 338/22 R |
| 5,367,282 A | * | 11/1994 | Clem ......................... 338/22 R |
| 6,094,128 A | * | 7/2000 | Bennett et al. ............... 338/21 |
| 6,134,771 A | * | 10/2000 | Nakamura et al. ............ 29/612 |

FOREIGN PATENT DOCUMENTS

| | | |
|---|---|---|
| DE | 11 53 807 | 9/1963 |
| DE | OS 23 58 911 | 6/1974 |
| DE | 3822533 A1 | 1/1989 |
| DE | GM 89 13 803.1 | 4/1990 |
| DE | 0 209 265 B1 | 8/1991 |
| DE | 41 08 789 A1 | 7/1992 |
| DE | 42 37 038 C2 | 2/1995 |

* cited by examiner

Primary Examiner—Elvin Enad
Assistant Examiner—Kyung S. Lee
(74) Attorney, Agent, or Firm—Akin, Gump, Strauss, Hauer & Feld, L.L.P.

(57) ABSTRACT

For manufacturing of sensors, especially temperature sensors, respectively two connection bridges spaced in the grid of a continuous carrier strip with contact pads for later electrical and mechanical connection with respectively one sensor element in the continuous carrier strip are at least partially injection molded around with plastic, such that on the connection bridges at least two plastic bodies arise arranged at a distance to each other. Between plastic bodies of respectively adjacent connection bridges, spacer elements made of plastic are formed in the same injection operation, while contact pads and ends of the connection bridges remain free of plastic. In connection with the injection operation, the edges of the carrier strip are separated from the connection bridges by punching. On the respective connection areas of two connection bridges, held together in pairs by means of plastic bodies, the actual sensor elements are installed and connected electrically and mechanically firmly with the contact pads by soldering. Subsequently, there follows a separation of sensors by detaching the spacer elements from the respective plastic bodies. A comparatively simple manufacturing process, as well as a function test, in the form of a multi-unit preform proves to be advantageous. Furthermore, by bending along the connection bridges, an adaptation to a customer-specific housing shape can be brought about.

7 Claims, 2 Drawing Sheets

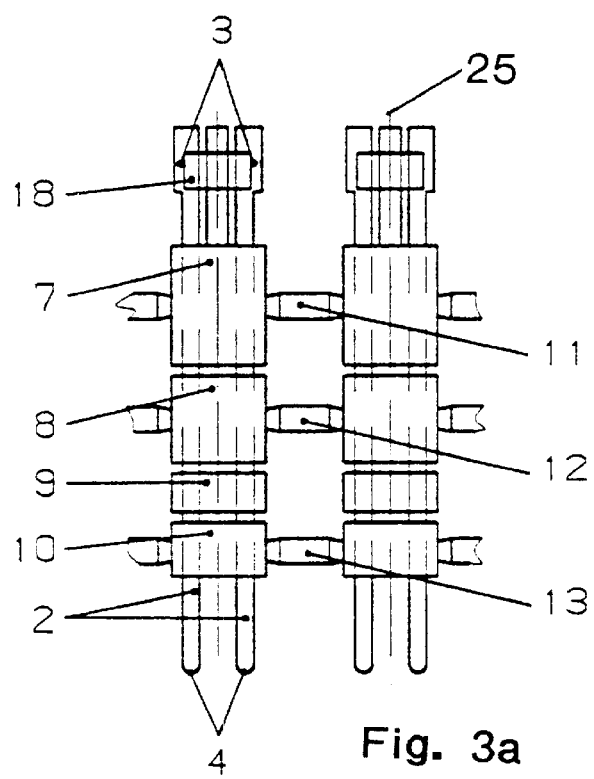
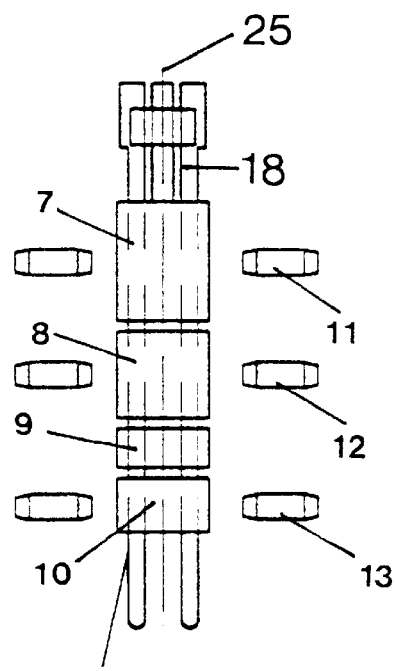
Fig. 3a    Fig. 3b
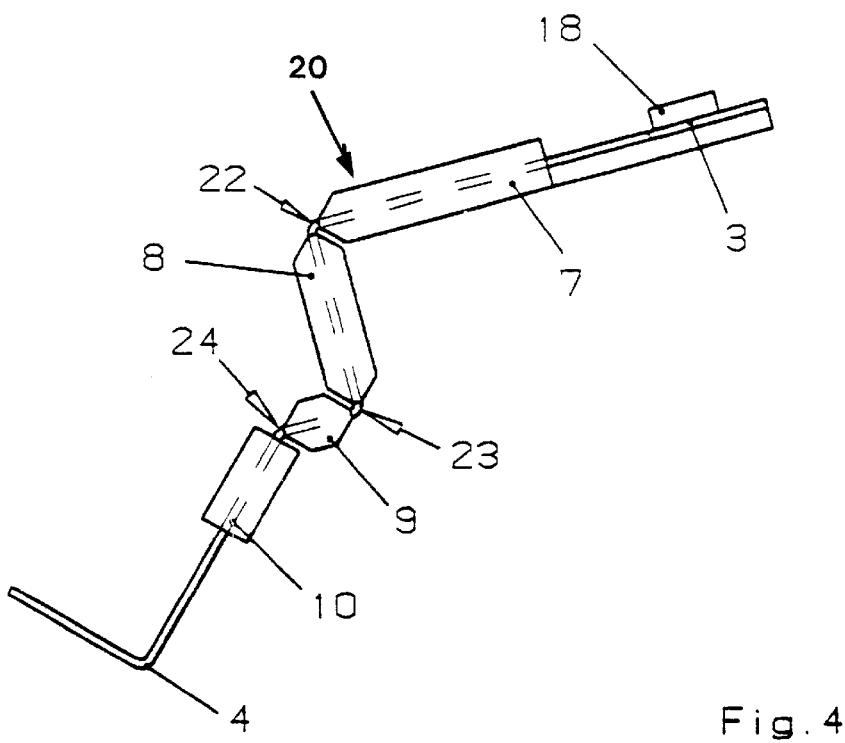
Fig. 4

PROCESS FOR MANUFACTURE OF SENSORS, AND SENSOR SO MADE, PARTICULARLY A TEMPERATURE SENSOR

BACKGROUND OF THE INVENTION

The invention relates to a process for manufacturing sensors, especially temperature sensors, wherein respectively at least two spaced connection bridges arranged in the grid of a continuous carrier strip and having contact pads for electrically and mechanically firm connections are provided with respectively one sensor element, and wherein initially continuous edges of the carrier strip are subsequently separated from the connection bridges. The invention also relates to a temperature sensor, especially one made by the process of the invention.

From German utility model G 89 13 803.1, a resistance thermometer for measuring surface temperature is known, which has a metal layer temperature sensor in a housing. The metal layer temperature sensor is arranged in a plastic housing of electronic output elements with a cooling surface, wherein the connection formed for cooling the electronic component and provided with a bore hole forms the carrier of the metal layer temperature sensor. The connection surfaces of the metal layer temperature sensor are connected by contacting wires with the connections provided for the electronic output component, wherein the housing is bordered by the metal surfaces of the connection used as a carrier and the plastic casing enclosing the metal layer temperature sensor and the contact points of the bonding wires with the connections guided on the outside. The plastic casing consists of epoxide resin and is manufactured in an injection molding tool of an injection molding machine. An injection molding machine is known, for example, from DE-OS 23 58 911.

According to DE G 89 13 803.1, it is a matter of a resistance thermometer whose connection bridges can be manufactured by means of a continuous carrier strip (as it is usually used for micro-chip conductor frames and is known, for example, from EP 0 209 265 B1). Owing to the electrical connection by means of bonding wires, it is moreover a matter of a comparatively expensive finishing. Furthermore, it is not possible without more to use the resistance thermometer in any desired housing construction, as is usual owing to the increasing importance of temperature sensors, for example in motor vehicle engineering.

From DE 41 08 789 a temperature sensor is known which is suitable for the air stream of a turbo-charger in a motor vehicle; it uses an electronic component whose electrical resistance varies with temperature. The temperature responsive component sits in a flat indentation in an endface of the sensor housing. The component has no covering so that it can be completely exposed to the flow of the medium to be measured. The terminal wires of the component extend at a distance along the outside of the housing to contact tags. These wires are only insulated close to the component itself. The component is preferably a negative temperature coefficient pill. The connecting wires are of poor heat conductive material. The component can be protected by a bowed piece with two shanks which can be clipped on.

From DE 38 22 533 A1 the manufacturing of a temperature sensor using an automation method is known. A plastic material connecting element is first pressed onto two lamellar plugs joined by a bridge to mechanically join two sections of plug. The bridge is then separated so that the plugs are electrically isolated from each other. The ends of two connectors of a temperature sensor are soldered to sections of the plugs. A carrier housing for the plugs and the temperature sensor is then pressed on. The housing has a first section for protecting the temperature sensor and a second, beaker-shaped section in which the ends of the plugs are arranged for coupling to a suitable plug connector.

From DE 42 37 038 an injection-molded plastic temperature sensor, e.g., for an internal combustion engine, with a resistive temperature sensor is known. The temperature sensor has connector contacts soldered to the temperature sensing resistor and placed in an injection mold. A housing comprising a contact holder, connector flange and jacket is formed by injecting plastic material, carbon- or glass-fiber reinforced polyamide. A fixing flange may also be formed. The temperature sensor may be installed in a thermostat valve housing using an O-ring for sealing.

SUMMARY OF THE INVENTION

The invention sets for itself the objective of providing a manufacturing process for a temperature sensor with a measuring resistor as a sensor element. Here, besides an economical mass production according to the principle of a multi-unit preform, there also exists the possibility of adapting the sensor to locally provided housing shapes and nevertheless achieving a high stability.

The objective is accomplished according to the invention in that respectively at least two connection bridges in continuous carrier strips provided for connection with a sensor element are at least partially so injection molded around with plastic, that respectively at least two plastic bodies arise arranged spaced from each other on the connection bridges, wherein between plastic bodies of adjacent connection bridges, spacer elements made of plastic are at least partially formed in the same injection process, while contact pads and ends of the connection bridges remain free of plastic.

In one advantageous embodiment of the process, respectively two adjacent plastic bodies are connected by spacer elements, wherein the respective plastic body/spacer element boundary is constructed as a rupture joint. Advantageously, the outer edges of the carrier strip are, in connection with the injection process in the injection molding tool, separated by punching from the connection bridges, wherein it is practically a matter of an operation connected with the injection process.

The sensor elements are then placed with their respective connection regions on the contact surfaces of the connection bridges and soldered for electrical and mechanical connection, wherein a subsequent electrical function test can be conducted in the continuous preform or multi-unit preform. For separation of sensors from the multi-unit preform, the spacer elements are broken in the region of their respective rupture joints. At least two plastic bodies are provided per sensor element, whereby respective interstices are created along the connection bridges between the plastic bodies or between sensor element and adjacent plastic body by bending along the connection bridges into a suitable form for their subsequent use as sensors. Advantageously, adjacent regions of the plastic body are pre-shaped on respectively one connection bridge, such that they serve as a stop upon bending.

It proves to be advantageous that, according to the process, a two-dimensional sensor arrangement is producible, which then for technical use can be adapted to the spatial structural conditions of the environment or the housing. Here, it proves to be especially advantageous that several plastic injection molding elements can be applied on the carrier arrangement, which then guarantee bending zones for the spatial adaptation for accommodating the sensor in special housings or local environments.

The objective is accomplished for a sensor, in which a sensor element is connected electrically and mechanically firmly via its own connection contacts with contact pads of a carrier arrangement, in that the carrier arrangement has at least two longitudinally extending connection bridges arranged at a distance from each other, which are connected mechanically fast by at least one injection molding element as a plastic body partially encasing them, wherein at one end of the carrier arrangement the connection bridges have contact pads for electrical and mechanical connection with the sensor element, while the other, opposite-lying end of the carrier arrangement is provided for connection with a measuring facility.

In one advantageous embodiment at least two plastic bodies are provided arranged at a distance from each other, wherein viewed along the respective axis of the connection bridges, interstices on the connection bridges situated between sensor element and plastic body or between the plastic bodies are constructed as bending zones for adaptation to predetermined housing structures.

Preferably, adjacent areas of plastic bodies are formed respectively in pairs as a stop for a bending operation along the axis of the connection bridges.

It proves to be especially advantageous that bonding wires or special supply leads can be dispensed with, wherein the sensor is also insertable into complex shaped housings. Here, an automatable processing is also advantageously possible.

BRIEF DESCRIPTION OF SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 3a shows the fitting of the connection bridges with sensor elements;

FIG. 3b shows the separation of the sensors; and

FIG. 4 shows a customer-specific configuration of the sensors along the connection bridges for adaptation to predetermined housing shapes.

DETAILED DESCRIPTION OF THE INVENTION

Figure 1:
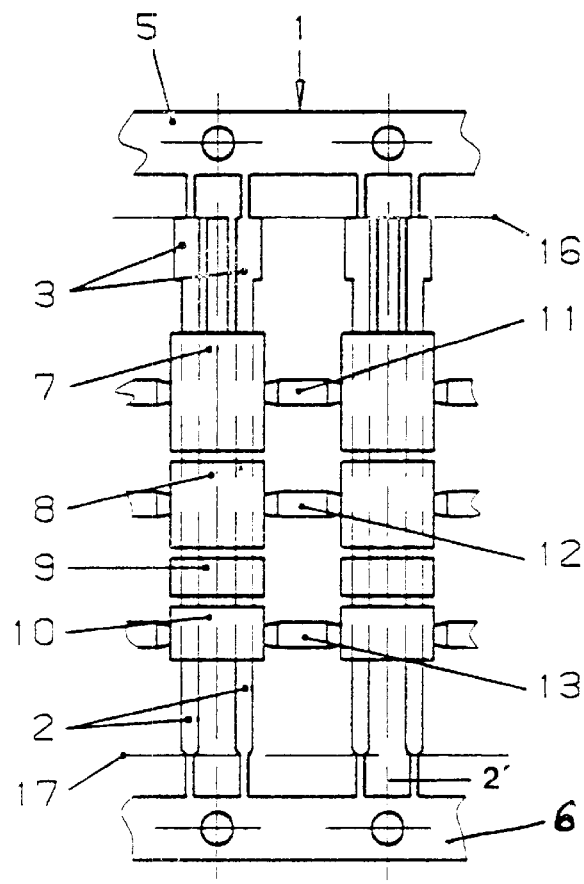
FIG. 1 depicts schematically the injection molding around of connection bridges in the carrier strips or endless band.

According to FIG. 1, between the continuous edges or edge strips 5, 6 of a carrier strip 1, connection bridges 2 are arranged with longitudinal axes 2' perpendicular to the direction of transport. The respective bridges 2 are provided on one end with contact pads 3 for electrical and mechanical connection with sensor elements to be installed, while they include on their other end typical connection contacts 4 for connection to an evaluation unit. The regions lying opposite the connection bridges 2 are respectively provided with an edge strip 5, 6 of the carrier strip 1. The distances between the connection bridges 2 or the contact pads 3 are so selected that they are at the same time suitable as a grid for the fitting position for a respective sensor element to be applied.

It is schematically represented in FIG. 1 that, by means of an injection molding tool not visible here, two respective connection bridges 2 belonging to a sensor element are partially injection molded around with plastic bodies 7, 8, 9 and 10, so that interstices arise between the respective plastic bodies or between the contact pads 3 and the respectively adjacent plastic bodies 7, as seen along the axis 2' of the connection bridges 2. The plastic bodies are so selected in their shape, that the connection bridges can be adapted in practical use by bending or buckling along the axes 2' of the connection bridges 2 to the respective housing shape for the subsequent use. Between the plastic bodies 7, 8, 9 and 10 of two successive carrier arrangements in the grid extent, additional plastic bodies 11, 12, 13 are cast on as spacer elements, which include rupture points in the boundary region between plastic body and spacer element, so that the carrier arrangements can be separated into sensors in a later process step.

Furthermore, in FIG. 1, punching lines 16, 17 for the punching operation for separating the edge strips 5, 6 are schematically represented.

The carrier strip 1 comprises a material known in the "lead frame" technology, preferably made of tin-plated copper or copper alloy. In a preferred embodiment, a nickel barrier layer with a thickness in the range of 1 to 3 $\mu$m is provided between the tin plating and the copper-containing carrier. The carrier strip has a typical etching or punch element thickness in the range of 0.15 to 0.25 $\mu$m, preferably 0.2 mm.

Figure 2A:
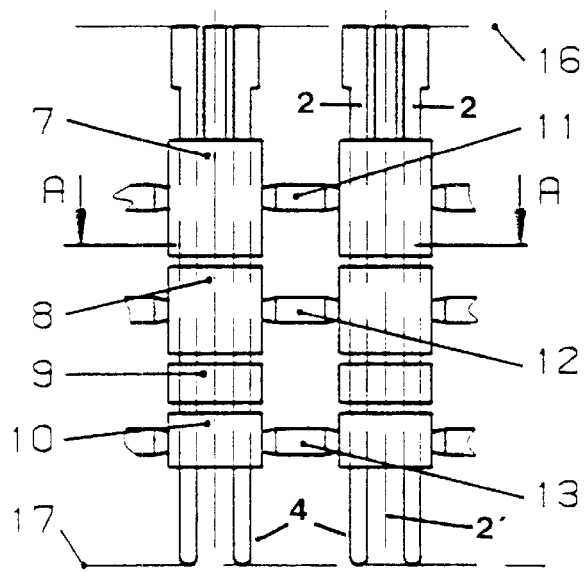
FIG. 2a shows schematically the punching out the edges of the carrier arrangement in the injection molding tool.

FIG. 2a shows the connection bridges separated along the punching lines 16, 17 from the no longer visible edge strips. Punching out the edge strip takes place in the injection molding tool, so that there is no particular work step for this.

Figure 2B:
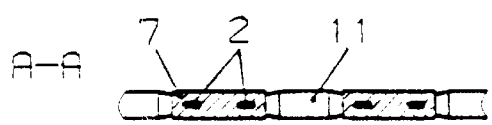
FIG. 2b represents a side view of the multi-unit preform after the punching, wherein the connection bridges are recognizable in profile.

FIG. 2b shows a side view of the multi-unit preform after the punching operation, wherein in the profile of the preform, the connection bridges 2, the plastic bodies 7, as well as the spacer elements 11 made of plastic are also recognizable. The further connection of the multi-unit preform by the spacer elements makes possible a simple installation and function testing after the electrical and mechanical connection of the sensor elements 18 with the respective contact pads according to FIG. 3a. This figure schematically depicts the fitting in the multi-unit preform (i.e., in the continuous plastic-metal interlocking system) of the carrier arrangements with the sensor elements, wherein the sensor elements 18 with their connection contacts are soldered onto the contact pads 3 of the connection bridges 2. Subsequently, the carrier arrangements 20 are separated as sensors by breaking off the plastic bodies provided as spacer elements 11, 12, 13 with their rupture points according to FIG. 3b, and according to FIG. 4 are brought for customer-specific applications into a three-dimensional form by bending the carrier arrangements 20 along the axis of the connection bridges. Here, it is important that the bending or buckling points 22, 23, 24 lie in the areas left free between sensor element 18, plastic body 7 or between plastic bodies 7 and 8, or 8 and 9.

Between the contact pads 3 of the connection bridges 2, a so-called depth stop 25 made of plastic is recognizable respectively along the axis 2', which is likewise generated during the injection operation and, owing to its stability, serves to protect the connection bridges 2 or the sensor element 18 upon subsequent insertion into housings or pockets. Consequently, especially in connection with automatic assembly, no force is exerted on the connection bridges 2 or on the sensor element 18.

At the outermost end of the connection bridges 2, the terminal connections 4 for the electric connection to an evaluation facility are to be recognized. Consequently, it is possible to bend or buckle the carrier arrangement such that it can be adapted on site to the respective housing shapes. Moreover, the sensor can contain its own housing adapted to the environment, or be accommodated in a foreign housing.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A sensor, especially a temperature sensor, comprising a sensor element (18) connected electrically and mechanically firmly via its own connection contacts with contact pads (3) of a carrier arrangement (20), wherein the carrier arrangement (20) has at least two elongated connection bridges (2) arranged at distance from each other, which are connected mechanically firmly by at least one injection molded part as a plastic element (7, 8, 9, 10) partially encasing them, and wherein at one end of the carrier arrangement the connection bridges have contact pads (3) for fitting with the sensor element (18), while the other end of the carrier arrangement is provided for connection with a measuring facility, wherein
at least two plastic bodies (7, 8, 9, 10) are provided arranged at a distance to each other, and wherein interstices situated between the sensor element (18) and plastic bodies (7) or between plastic bodies (7, 8, 9, 10) are formed along the connection bridges (2) as bending zones for adaptation to predetermined housing structures.

2. The sensor according to claim 1, wherein adjacent areas of plastic bodies (7, 8, 9, 10) arranged respectively on a connection bridge (2) are constructed in pairs as a stop for a bending operation.

3. A process for manufacturing sensors, especially temperature sensors, in a multi-unit preform, comprising:
providing a continuous carrier strip (1) having a grid structure comprising continuous edges (5, 6) running in a first direction of the carrier strip (1) and a plurality of sensor arrangements spaced along the carrier strip in the first direction and each having a longitudinal axis (2') running in a second direction transverse to the first direction, each sensor arrangement comprising at least two connection bridges (2) spaced apart in the first direction and attached at their respective ends to the continuous edges (5, 6), each sensor arrangement having contact pads (3) on the connection bridges (2) for electrical and mechanical contact with a sensor element (18) to be connected;
forming at least two plastic bodies (7, 8, 9 10) on the connection bridges (2) of each sensor arrangement by injection molding plastic around the connection bridges (2), the at least two plastic bodies being spaced apart along the longitudinal axis (2');
forming plastic spacer elements (11, 12, 13) in the first direction between the plastic bodies on connection bridges (2) of adjacent sensor arrangements, the plastic spacer elements being formed at least in part in the injection molding step, while leaving the contact pads (3) and the respective ends of the connection bridges (2) free of plastic, and forming rupture points at respective boundaries between the spacer elements (11, 12, 13) and the adjacent plastic bodies (7, 8, 10) connected by the spacer elements;
separating the continuous edges (5, 6) from the connection bridges (2);
placing a sensor element (18) with its respective connection areas upon the contact pads (3) of the connection bridges (2) of each sensor arrangement and soldering the connection areas to the contact pads; and
separating adjacent sensor arrangements from each other by breaking off the spacer elements (11, 12, 13) at the rupture points.

4. The process according to claim 3, wherein the continuous edges (5, 6) are separated from the connection bridges (2) by punching in connection with the injection molding step.

5. The process according to claim 3, further comprising bending the connection bridges (2) at interstices formed between adjacent plastic bodies (7, 8, 9, 10) or between the sensor element (18) and an adjacent plastic body (7) to bring the sensor arrangement into a suitable form for sensor application.

6. The process according to claim 5, further comprising shaping adjacent parts of the plastic bodies (7, 8, 9, 10) on a respective connection bridge (2) such that the shaped parts serve as stops against each other in the bending step.

7. A sensor, especially a temperature sensor, comprising a sensor element (18) connected electrically and mechanically firmly via its own connection contacts with contact pads (3) of a carrier arrangement (20), wherein the carrier arrangement (20) has at least two elongated connection bridges (2) arranged at distance from each other, which are connected mechanically firmly by at least one injection molded part as a plastic element (7, 8, 9, 10) partially encasing them, and wherein at one end of the carrier arrangement the connection bridges have contact pads (3) for fitting with the sensor element (18), while the other end of the carrier arrangement is provided for connection with a measuring facility, wherein
a plastic depth stop (25) is arranged between the connection bridges (2) and extends from one of the plastic bodies (7) to protect the connection bridges (2) or the sensor element (18).

* * * * *